(12) United States Patent
Takuman et al.

(10) Patent No.: US 6,180,704 B1
(45) Date of Patent: Jan. 30, 2001

(54) HEAT-CURABLE SILICONE RUBBER COMPOSITION

(75) Inventors: Osamu Takuman; Makoto Yoshitake, both of Chiba Prefecture (JP)

(73) Assignee: Dow Corning Toray Silicone Co., Ltd., Tokyo (JP)

( * ) Notice: Under 35 U.S.C. 154(b), the term of this patent shall be extended for 0 days.

(21) Appl. No.: 09/337,563

(22) Filed: Jun. 22, 1999

(30) Foreign Application Priority Data

Jun. 25, 1998 (JP) .................................................. 10-194948

(51) Int. Cl.⁷ ..................................................... C08L 83/00
(52) U.S. Cl. ............................. 524/267; 523/466; 528/24; 528/32; 556/431; 556/465; 524/588
(58) Field of Search ............................. 523/466; 524/860, 524/730, 731, 588; 556/459, 431, 465; 528/32, 24

(56) References Cited

U.S. PATENT DOCUMENTS 6,077,500 * 6/2000 Dvornic et al. .................. 525/424 X

FOREIGN PATENT DOCUMENTS

| 976775 | * | 2/2000 | (EP) . |
| 9-95612 | | 4/1997 | (JP) . |
| 10-166423 | | 5/1998 | (JP) . |
| 11-343347 | * | 12/1999 | (JP) . |

* cited by examiner

*Primary Examiner*—Robert Dawson
*Assistant Examiner*—Marc S. Zimmer
(74) *Attorney, Agent, or Firm*—William F. Boley

(57) ABSTRACT

A Heat-curable silicone rubber composition comprising (A) 100 weight parts organopolysiloxane with the average unit formula $R_xSiO_{(4-x)/2}$ each R is independently selected from the group consisting of hydroxyl and substituted and unsubstituted monovalent hydrocarbon groups and x has a value from 1.9 to 2.1 and containing at least 2 silicon-bonded alkenyl groups in each molecule, (B) 10 to 100 weight parts reinforcing filler, (C) 0.1 to 10 weight parts carboxiloxane dendrimer that contains at least 3 silicon-bonded hydrogen atoms in each molecule, and (D) 0.1 to 10 weight parts organoperoxide.

6 Claims, No Drawings

HEAT-CURABLE SILICONE RUBBER COMPOSITION

BACKGROUND OF INVENTION

This invention is heat-curable silicone rubber compositions. More particularly, this invention is heat-curable silicone rubber compositions that cure rapidly to give very mechanically strong, nondiscoloring silicone rubber.

The silicone rubber compositions known as millable silicone rubbers as a general rule cure in the presence of organoperoxide and heat to give highly heat-resistant, highly weather-resistant silicone rubbers that have excellent electrical properties, and this good property set has resulted in the frequent use of these compositions in applications where these properties are critical. This notwithstanding, a drawback to silicone rubber compositions of this type has been their slow cure rate. There have already been attempts at raising the cure rate of these silicone rubber compositions. For example, Japanese Laid Open (Kokai or Unexamined) Patent Application Number Hei 9-95612 (95,612/1997) teaches a cure rate-enhancing method in which dimethylsiloxy-endblocked dimethylsiloxane-methylhydrogensiloxane copolymer is blended into a silicone rubber composition that can be cured by 2,5-dimethyl-2,5-di(tert-butylperoxy)hexane.

However, the silicone rubber moldings afforded by this method have a pronounced tendency to stick to the mold or die and thus suffer from poor mold-release properties. Thick silicone rubber moldings prepared by this method also fail to undergo cure in all sections, which prevents the production of silicone rubber moldings of uniform mechanical strength.

As a result of extensive investigations directed to solving the problems described above, the inventors discovered that these problems could be solved by the admixture of a specific type of carbosiloxane dendrimer into organoperoxide-curing silicone rubber compositions. More specifically, the object of the present invention is to provide a heat-curable silicone rubber composition that cures rapidly to give very mechanically strong, nondiscoloring silicone rubber.

SUMMARY OF INVENTION

A Heat-curable silicone rubber composition comprising
(A) 100 weight parts organopolysiloxane with the average unit formula $R_xSiO_{(4-x)/2}$ containing at least 2 silicon-bonded alkenyl groups in each molecule, where each R is independently selected from the group consisting of hydroxyl and substituted and unsubstituted monovalent hydrocarbon groups and x has a value from 1.9 to 2.1,
(B) 10 to 100 weight parts reinforcing filler,
(C) 0.1 to 10 weight parts carbosiloxane dendrimer that contains at least 3 silicon-bonded hydrogen atoms in each molecule, and
(D) 0.1 to 10 weight parts organoperoxide.

DESCRIPTION OF INVENTION

The present invention is a heat-curable silicone rubber composition comprising
(A) 100 weight parts organopolysiloxane with an average unit formula $R_xSiO_{(4-x)/2}$ containing at least 2 silicon-bonded alkenyl groups in each molecule, where each R is independently selected from the group consisting of hydroxyl and substituted and unsubstituted monovalent hydrocarbon groups and x has a value of from 1.9 to 2.1,
(B) 10 to 100 weight parts reinforcing filler,
(C) 0.1 to 10 weight parts carbosiloxane dendrimer that contains at least 3 silicon-bonded hydrogen atoms in each molecule, and
(D) 0.1 to 10 weight parts organoperoxide.

To explain the preceding in greater detail, the organopolysiloxane (A), which is the base component of the present composition, is defined by the average unit formula $R_xSiO_{(4-x)/2}$. The group R in this formula can be the hydroxyl group or a substituted or unsubstituted monovalent hydrocarbon group as exemplified by alkyl such as methyl, ethyl, propyl, butyl, and octyl; alkenyl such as vinyl, allyl, butenyl, and hexenyl; aryl such as phenyl; 3,3,3-trifluoropropyl; 2-phenylethyl; and 2-cyanoethyl. The subscript x is a number from 1.9 to 2.1. Each molecule of this component must contain at least 2 silicon-bonded alkenyl groups. This alkenyl group can be bonded in pendant or chain terminal position or in both positions. Component (A) can have a straight-chain or partially branched straight-chain molecular structure. While the viscosity of component (A) is not crucial, a preferred viscosity at 25° C. is from 1,000 to 20,000,000 mPa.s. Component (A) can be a homopolymer, copolymer, or a mixture of these polymers. The siloxy units making up component (A) are exemplified by the dimethylsiloxy unit, methylvinylsiloxy unit, and 3,3,3-trifluoropropylmethylsiloxy unit. The group present at the molecular terminals of component (A) are exemplified by trimethylsiloxy, silanol, dimethylvinylsiloxy, and methylvinylhydroxysiloxy. The organopolysiloxane under consideration can be exemplified by dimethylvinylsiloxy-endblocked dimethylsiloxane-methylvinylsiloxane copolymers, dimethylvinylsiloxy-endblocked dimethylpolysiloxanes, silanol-endblocked dimethylsiloxane-methylvinylsiloxane copolymers, and methylvinylhydroxysiloxy-endblocked dimethylsiloxane-methylvinylsiloxane copolymers.

The reinforcing filler (B) used in the present composition is an essential component that imparts high levels of mechanical strength to the silicone rubber moldings afforded by cure of the composition. This reinforcing filler is exemplified by dry-process silicas such as fumed silicas and by wet-process silicas such as precipitated silicas and by the microparticulate silicas afforded by hydrophobicizing the surface of a silica as listed above with an organosilicon compound such as an organosilane, organosilazane, organopolysiloxane, or diorganocyclopolysiloxane. This component should have a particle diameter no greater than 50 μm and preferably has a specific surface area of at least 50 m²/g and more preferably of at least 100 m²/g. Component (B) is admixed at from 10 to 100 weight parts of component (A) per 100 weight parts component (A). The use of less than 10 weight parts will result in an inadequate mechanical strength after cure of the composition, while at more than 100 weight parts it becomes quite difficult to blend component (B) into component (A).

The SiH-functional carbosiloxane dendrimer (C) used in the present composition is the component that characterizes this composition and must contain at least 3 silicon-bonded hydrogens in each molecule. As used herein, SiH-functional carbosiloxane dendrimer denotes a high-molecular-weight compound with a predictable and highly branched structure that elaborates radially from a single core. Carbosiloxane dendrimers with such a structure are described in detail, for example, in Japanese Patent Application Number H10-166423 (166,423/1998), filed May 29, 1998, to Dow Corning Toray Silicone Co., Ltd. Among the therein described carbosiloxane dendrimers, the carbosiloxane dendrimers preferred for the present invention contains in each molecule at least 3 SiH and at least one siloxane unit with the general formula $$X^1R^1_a SiO_{(3-a)/2},$$

where $R^1$ is a $C_1$ to $C_{10}$ alkyl or an aryl, a is an integer from 0 to 2, and $X^1$ is a silylalkyl group with the following formula at i=1

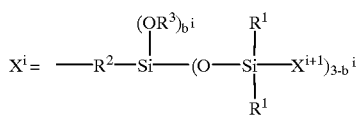

$R^1$ is a $C_1$ to $C_{10}$ alkyl or an aryl, $R^2$ is a $C_2$ to $C_{10}$ alkylene, $R^3$ is a $C_1$ to $C_{10}$ alkyl, $X^{i+1}$ is the above-defined silylalkyl group at i=i+1 or the hydrogen atom, i is an integer with a value from 1 to 10 that specifies the generation of the silylalkyl group, and $b^i$ is an integer from 0 to 3 with the proviso that $b^1$ in at least one $X^1$ in each molecule is an integer from 0 to 2; wherein when more than 1 is present the subject siloxane units may be the same or different, and has for its core a polysiloxane structure of at least 2 silicon atoms that contains the aforesaid siloxane unit(s).

$R^1$ in the preceding formulas used to specify the preferred carbosiloxane dendrimers is a $C_1$ to $C_{10}$ alkyl or an aryl. The alkyl encompassed by $R^1$ can be exemplified by methyl, ethyl, propyl, butyl, pentyl, isopropyl, isobutyl, cyclopentyl, and cyclohexyl, while the aryl encompassed by $R^1$ can be exemplified by phenyl and naphthyl. Methyl is preferred among the preceding. The subscript a is an integer with a value from 0 to 2. $X^1$ is the silylalkyl group with the following formula at i=1.

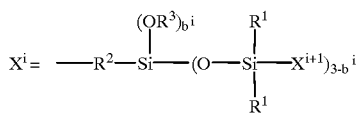

$R^1$ in this formula is defined as above. $R^2$ in the preceding formula is a $C_2$ to $C_{10}$ alkylene, for example, straight-chain alkylene such as ethylene, propylene, butylene, and hexylene and branched alkylene such as methylmethylene, methylethylene, 1-methylpentylene, and 1,4dimethylbutylene. Ethylene, methylmethylene, hexylene, 1-methylpentylene, and 1,4-dimethylbutylene are preferred for $R^2$. $R^3$ is a $C_1$ to $C_{10}$ alkyl, for example, methyl, ethyl, propyl, butyl, pentyl, and isopropyl, among which methyl and ethyl are preferred. $X^{i+1}$ is the hydrogen atom or the above-defined silylalkyl group. i is an integer from 1 to 10 that indicates the number of generations of the silylalkyl group under consideration, i.e., it indicates the number of repetitions of this silylallyl group. The subscript $b^i$ is an integer from 0 to 3 wherein $b^1$ in at least one $X^1$ in each molecule is an integer from 0 to 2. Thus, this silylalkyl group has the following general formula when the number of generations is 1:

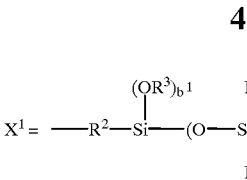

the following general formula when the number of generations is 2:

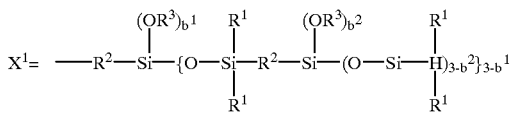

and has the following general formula when the number of generations is 3.

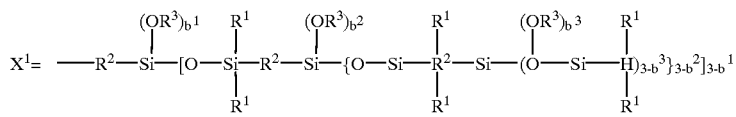

The polysiloxane structure having at least 2 silicon atoms that is present in this carbosiloxane dendrimer must contain at least 1 siloxane unit as represented by the general formula $X^1R^1_a SiO_{(3-a)/2}$ wherein when more than 1 is present the subject siloxane units may be the same or different. The structural units in this organosiloxane comprise monofunctional siloxane units (M units) with the general formulas $X^1R^1_2 SiO_{1/2}$ and $R^1_3 SiO_{1/2}$, difunctional siloxane units (D units) with the general formulas $X^1R^1 SiO_{2/2}$ and $R^1_2 SiO_{2/2}$, trifunctional siloxane units (T units) with the general formulas $X^1 SiO_{3/2}$ and $R^1 SiO_{3/2}$, and the tetrafunctional siloxane unit (Q unit) $SiO_{4/2}$. The polysiloxane under consideration can be more specifically exemplified by the following general formulas, in which $X^1$ and $R^1$ are defined as above and m, n, x, y, z, p, q, r, s, and t, which denote the number of siloxane units present in each molecule, have values $\geq 1$ wherein $p+q \geq 5$ and $s+t \geq 6$.

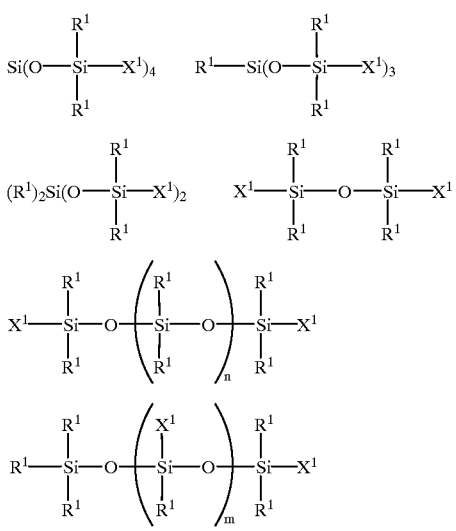

-continued

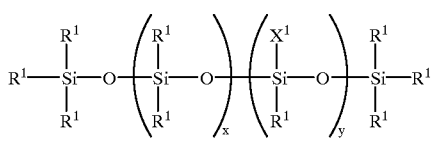

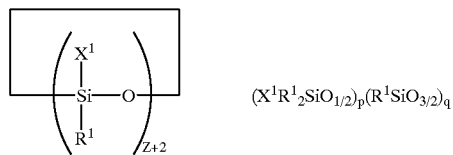

$(X^1SiO_{3/2})_r$  $(X^1R^1{}_2SiO_{1/2})_s(SiO_{4/2})_t$

The carbosiloxane dendrimer (C) can be a single compound or a mixture of compounds. The dispersity index of the molecular weight (polystyrene basis), that is, weight-average molecular weight/number-average molecular weight ($M_w/M_n$), is preferably $\leq 2$. The subject carbosiloxane dendrimer can be specifically exemplified by polymers with the following average molecular formulas.

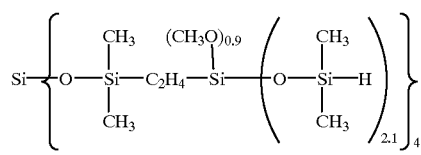

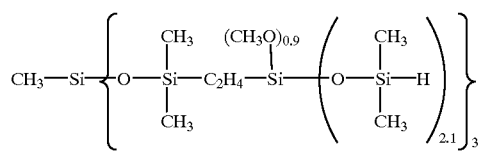

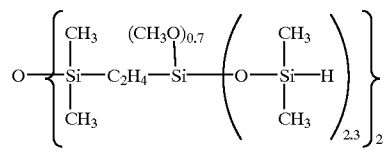

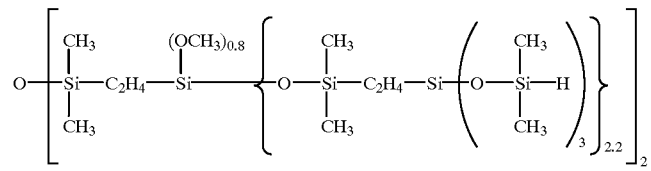

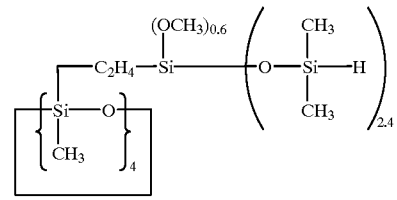

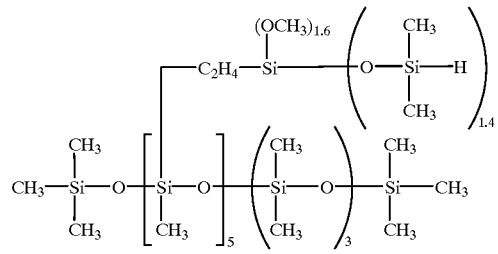

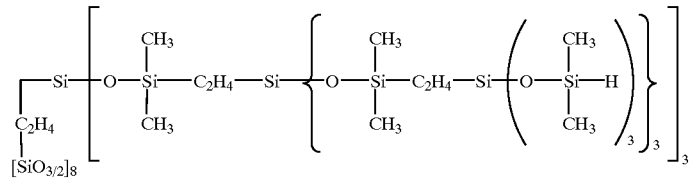

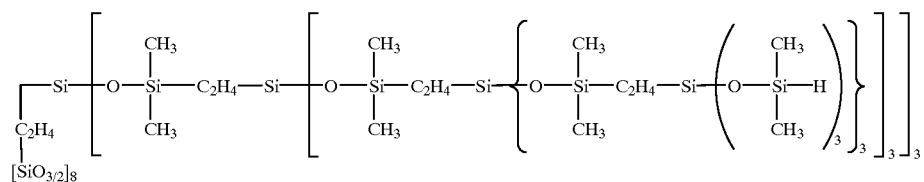

-continued

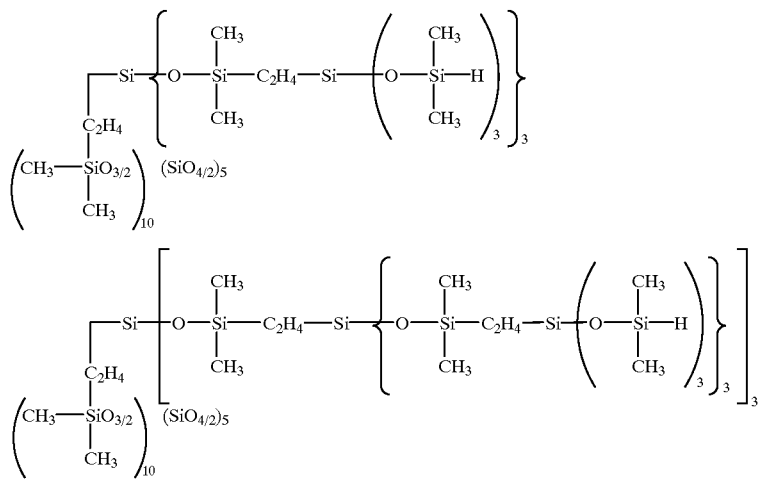

The organoperoxide (D) used in the present composition functions to cure the composition. This organoperoxide can be exemplified by benzoyl peroxide; methyl-substituted benzoyl peroxides such as bis(ortho-methylbenzoyl peroxide), bis(meta-methylbenzoyl peroxide), bis(para-methylbenzoyl peroxide), 2,3-dimethylbenzoyl peroxide, 2,4-dimethylbenzoyl peroxide, 2,6-dimethylbenzoyl peroxide, 2,3,4-trimethylbenzoyl peroxide, and 2,4,6-trimethylbenzoyl peroxide; tert-butyl perbenzoate; dicumyl peroxide; and 2,5-dimethyl-2,5-di(tert-butylperoxy)hexane. The organoperoxide is added generally at from 0.1 to 10 weight parts and preferably at from 1 to 5 weight parts, in each case per 100 weight parts component (A).

The present composition comprises the components (A) to (D) as described above, but may also contain, insofar as the object of the present invention is not impaired, the various additives known in the art for addition to silicone rubber compositions. These additives can be generally exemplified by nonreinforcing fillers, inorganic pigments, heat stabilizers, flame retardants, internal release agents, and plasticizers. The nonreinforcing fillers can be specifically exemplified by diatomaceous earth, quartz powder, calcium carbonate, mica, talc, magnesium oxide, aluminum oxide, aluminum hydroxide, and magnesium hydroxide. The inorganic pigments can be specifically exemplified by iron oxide red and titanium dioxide. The heat stabilizer can be exemplified by rare earth oxides, rare earth hydroxides, cerium silanolate, and the fatty acid salts of cerium. The flame retardants can be exemplified by platinum, platinum compounds, benzotriazole, fumed titanium dioxide, manganese carbonate, and zinc carbonate. The internal release agents can be exemplified by fatty acid salts such as calcium stearate.

The present composition can be prepared simply by mixing components (A) to (D) to homogeneity in their specified proportions or by mixing the optional additive components to homogeneity with components (A) to (D) in their specified proportions. The means for intermixing components (A) to (D) and the optional additive components can be those mixing devices and mixing/kneading devices heretofore used for the preparation of silicone rubber compositions, for example, kneader mixers, twin-screw continuous extrusion mixers, and two-roll mills.

The present composition can be cured by heating the composition to at least the decomposition temperature of the organoperoxide (D) while staying below temperatures at which scorching would occur. In specific terms, this will be in the range from 130° C. to 200° C. and is preferably in the range from 140° C. to 170° C. The present composition can be molded by those methods heretofore known for molding heat-curing silicone rubber compositions, such as compression molding, injection molding, and extrusion molding.

The present heat-curable silicone rubber composition has a high cure rate and therefore can support reductions in the molding cycle time during molding resulting in major reductions in molding costs. Moreover, the cured silicone rubber afforded by this composition exhibits excellent mechanical strength and resists discoloration and is therefore well-suited for use in those applications were such properties are critical.

The invention will be explained in greater detail below using working examples, in which parts denotes weight parts. The properties of the silicone rubbers were measured as follows.

Tensile Strength and Tensile Elongation

Test specimens with a thickness of 2 mm were fabricated by first press-curing the silicone rubber composition at 170° C. for 10 minutes and then oven-curing at 200° C. for 4 hours. The test specimens were test for tensile strength and elongation according to JIS K-6251.

Compression Set

Cylindrical test specimens (diameter=29 mm, thickness= 12.5 mm) were fabricated by first press-curing the silicone rubber composition at 170° C. for 10 minutes and then oven-curing at 200° C. for 4 hours. The test specimens were tested for compression set according to JIS K-6263.

Cure Rate

The time ($T_{90}$) for the torque value to reach 90% of the final torque value was measured using a Curastometer (model JSR Curastometer-III from Orientec) at a temperature of 170° C.

Color Change

The color change was evaluated visually.

Reference Example 1. 103.6 g Of vinyltrimethoxysilane and 0.04 g of a 3 weight percent solution of chloroplatinic acid in isopropanol were introduced into a 200-mL four-neck flask equipped with a stirrer, thermometer, reflux condenser, and an addition funnel and then heated to 100° C. while stirring. To this was then gradually added 49.4 g of tetrakis(dimethylsiloxy)silane dropwise from the addition funnel so as to maintain the reaction temperature at 100 to 110° C. After completion of the addition, the reaction solution was heated for an additional 1 hour at 120° C. After cooling, the reaction solution was transferred to an evaporation flask and concentrated under reduced pressure on a rotary evaporator to give 138.4 g of a very light brown liquid. Then, 141.0 g of 1,1,3,3-tetramethyldisiloxane, 100 mL of concentrated hydrochloric acid, 200 mL of water, and 200 mL of isopropanol were placed in a 1-liter four-neck flask equipped with a stirrer, thermometer, reflux condenser, and an addition funnel and were stirred. 80.6 g Of the very light brown liquid prepared as described above was then gradually added dropwise from the addition funnel over 1 hour. After the completion of addition, the reaction solution was stirred at room temperature for an additional 1 hour. The reaction solution was then transferred to a separatory funnel, the lower layer was separated off, and the remaining upper layer solution was washed 2 times with 200 mL of water, then washed once with 50 mL of saturated aqueous sodium bicarbonate solution, and finally dried over anhydrous magnesium sulfate. The produced solids were filtered off and the resulting solution was transferred to an evaporation flask and concentrated under reduced pressure on a rotary evaporator to yield carbosiloxane dendrimer with the following average compositional formula.

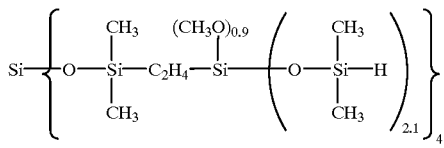

Reference Example 2. 103.6 g Of vinyltrimethoxysilane and 0.04 g of a 3 weight percent solution of chloroplatinic acid in isopropanol were introduced into a 200-mL four-neck flask equipped with a stirrer, thermometer, reflux condenser, and an addition funnel and then heated to 100° C. while stirring. To this was gradually added 49.4 g of methyltris(dimethylsiloxy)silane dropwise from the addition funnel so as to maintain the reaction temperature at 100 to 110° C. After completion of the addition, the reaction solution was heated for an additional 1 hour at 120° C. After cooling, the reaction solution was transferred to an evaporation flask and concentrated under reduced pressure on a rotary evaporator to give 138.4 g of a very light brown liquid. Then, 141.0 g of 1,1,3,3-tetramethyldisiloxane, 100 mL of concentrated hydrochloric acid, 200 mL of water, and 200 mL of isopropanol were placed in a 1-liter four-neck flask equipped with a stirrer, thermometer, reflux condenser, and an addition funnel and were stirred. 80.6 g Of the very light brown liquid prepared as described above was then gradually added dropwise from the addition funnel over 1 hour. After the completion of addition, the reaction solution was stirred at room temperature for an additional 1 hour. The reaction solution was then transferred to a separatory funnel, the lower layer was separated off, and the remaining upper layer solution was washed twice with 200 mL of water, then washed once with 50 mL of saturated aqueous sodium bicarbonate solution, and finally dried over anhydrous magnesium sulfate. The produced solids were filtered off and the resulting solution was transferred to an evaporation flask and concentrated under reduced pressure on a rotary evaporator to yield carbosiloxane dendrimer with the following average compositional formula.

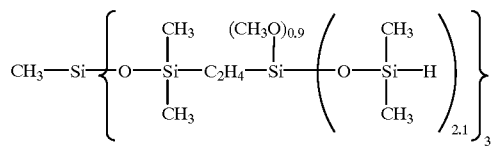

Reference Example 3. 88.9 g Of vinyltrimethoxysilane and 0.04 g of a 3 weight percent solution of chloroplatinic acid in isopropanol were introduced into a 200-mL four-neck flask equipped with a stirrer, thermometer, reflux condenser, and an addition funnel and then heated to 100° C. while stirring. To this was gradually added 30.0 g of 1,3,5,7-tetramethylcyclotetrasiloxane dropwise from the addition funnel so as to maintain the reaction temperature at 100 to 110° C. After completion of the addition, the reaction solution was heated for an additional 1 hour at 120° C. After cooling, the reaction solution was transferred to an evaporation flask and concentrated under reduced pressure on a rotary evaporator to give 100.4 g of a very light brown liquid. Then, 93.0 g of 1,1,3,3-tetramethyldisiloxane, 30 mL of concentrated hydrochloric acid, 60 mL of water, and 60 mL of isopropanol were placed in a 1-liter four-neck flask equipped with a stirrer, thermometer, reflux condenser, and an addition funnel and were stirred. 80.0 g Of the very light brown liquid prepared as described above was then gradually added dropwise from the addition funnel over 1 hour. After the completion of addition, the reaction solution was stirred at room temperature for an additional 1 hour. The reaction solution was then transferred to a separatory funnel, the lower layer was separated off, and the remaining upper layer solution was washed 2 times with 100 mL of water, then washed once with 100 mL of saturated aqueous sodium bicarbonate solution, and finally dried over anhydrous sodium sulfate. The solids were filtered off and the resulting solution was transferred to an evaporation flask and concentrated under reduced pressure on a rotary evaporator to yield carbosiloxane dendrimer with the following average compositional formula.

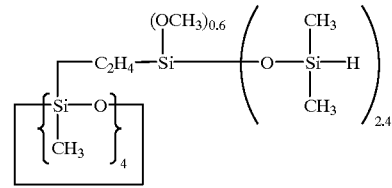

Example 1

The following were introduced into a kneader mixer and mixed to homogeneity: 100 parts dimethylvinylsiloxy-endblocked dimethylsiloxane-methylvinylsiloxane copolymer gum (99.87 mole % dimethylsiloxane units and 0.13 mole % methylvinylsiloxane units), 45 parts wet-process silica with a specific surface area of 200 m$^2$/g, and 4.5 parts silanol-endblocked dimethylpolysiloxane with a viscosity of 30 mPa.s. This mixture was then heated and mixed at 175° C. for 60 minutes to give a silicone rubber base compound. A silicone rubber composition was prepared on a two-roll mill by adding the following with mixing to homogeneity to 100 parts of this base: 0.5 part of the carbosiloxane dendrimer (silicon-bonded hydrogen content=0.65 weight %)

with the following average compositional formula as synthesized in Reference

Example 1

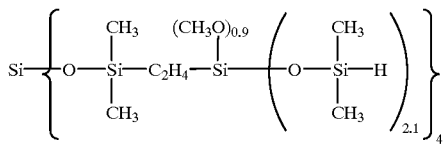

and 0.6 part of a 50 weight percent silicone oil paste masterbatch of 2,5-dimethyl-2,5-di(tert-butylperoxy) hexane.

The silicone rubber composition thus prepared was press-cured to mold a 2 mm-thick silicone rubber sheet for measurement of the physical properties as described above. These results are reported in Table 1. The cure rate and color change were also evaluated and these results are likewise reported in Table 1.

Example 2

The following were introduced into a kneader mixer and mixed to homogeneity: 100parts dimethylvinylsiloxy-endblocked dimethylsiloxane-methylvinylsiloxane copolymer gum (99.87 mole % dimethylsiloxane units and 0.13 mole % methylvinylsiloxane units), 45 parts wet-process silica with a specific surface area of 200 m²/g, and 4.5 parts silanol-endblocked dimethylpolysiloxane with a viscosity of 30 mPa.s. This mixture was then heated and mixed at 175° C. for 60 minutes to give a silicone rubber base compound. A silicone rubber composition was prepared on a two-roll mill by adding the following with mixing to homogeneity to 100 parts of this base: 0.5 part of the carbosiloxane dendrimer (silicon-bonded hydrogen content=0.69 weight percent ) with the following average compositional formula as synthesized in Reference Example 2

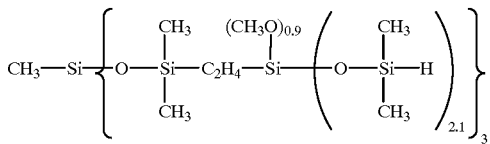

and 0.6 part of a 50 weight percent silicone oil paste masterbatch of 2,5-dimethyl-2,5-di(tert-butylperoxy) hexane.

The silicone rubber composition thus prepared was press-cured to mold a 2 mm-thick silicone rubber sheet for measurement of the physical properties as described above. These results are reported in Table 1. The cure rate and color change were also evaluated and these results are likewise reported in Table 1.

Example 3

The following were introduced into a kneader mixer and mixed to homogeneity: 100 parts dimethylvinylsiloxy-endblocked dimethylsiloxane-methylvinylsiloxane copolymer gum (99.87 mole % dimethylsiloxane units and 0.13 mole % methylvinylsiloxane units), 45 parts wet-process silica with a specific surface area of 200 m²/g, and 4.5 parts silanol-endblocked dimethylpolysiloxane with a viscosity of 30 mPa.s. This mixture was then heated and mixed at 175° C. for 60 minutes to give a silicone rubber base compound. A silicone rubber composition was prepared on a two-roll mill by adding the following with mixing to homogeneity to 100 parts of this base: 0.5 part of the carbosiloxane dendrimer (silicon-bonded hydrogen content=0.72 weight percent) with the following average compositional formula as synthesized in Reference Example 3

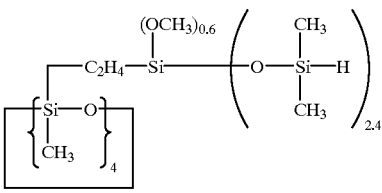

and 0.6 part of a 50 weight percent silicone oil paste masterbatch of 2,5-dimethyl-2,5-di(tert-butylperoxy) hexane.

The silicone rubber composition thus prepared was press-cured to mold a 2 mm-thick silicone rubber sheet for physical properties testing as described above. These results are reported in Table 1. The cure rate and color change were also evaluated and these results are likewise reported in Table 1.

Comparative Example 1

The following were introduced into a kneader mixer and mixed to homogeneity: 100 parts dimethylvinylsiloxy-endblocked dimethylsiloxane-methylvinylsiloxane copolymer gum (99.87 mole % dimethylsiloxane units and 0.13 mole % methylvinylsiloxane units), 45 parts wet-process silica with a specific surface area of 200 m²/g, and 4.5 parts silanol-endblocked dimethylpolysiloxane with a viscosity of 30 mPa.s. This mixture was then heated and mixed at 175° C. for 60 minutes to give a silicone rubber base compound. A silicone rubber composition was prepared on a two-roll mill by adding 0.6 part of a 50 weight percent silicone oil paste masterbatch of 2,5-dimethyl-2,5-di(tert-butylperoxy) hexane with mixing to homogeneity to 100 parts of this base.

The silicone rubber composition thus prepared was press-cured to mold a 2 mm-thick silicone rubber sheet for measurement of the physical properties as described above. These results are reported in Table 1. The cure rate and color change were also evaluated and these results are likewise reported in Table 1.

Comparative Example 2

The following were introduced into a kneader mixer and mixed to homogeneity: 100 parts dimethylvinylsiloxy-endblocked dimethylsiloxane-methylvinylsiloxane copolymer gum (99.87 mole % dimethylsiloxane units and 0.13 mole % methylvinylsiloxane units), 45 parts wet-process silica with a specific surface area of 200 m²/g, and 4.5 parts silanol-endblocked dimethylpolysiloxane with a viscosity of 30 mPa.s. This mixture was then heated and mixed at 175° C. for 60 minutes to give a silicone rubber base compound. A silicone rubber composition was prepared on a two-roll mill by adding the following with mixing to homogeneity to 100 parts of this base: 0.5 part organohydrogenpolysiloxane (silicon-bonded hydrogen content=0.70 weight percent) and 0.6 part of a 50 weight percent silicone oil paste masterbatch of 2,5-dimethyl-2,5-di(tert-butylperoxy)hexane. The properties of this composition were measured and evaluated as in Example 1 and the results are reported in Table 1.

TABLE 1

|  | Example 1 | Example 2 | Example 3 | Comp. Example 1 | Comp. Example 2 |
|---|---|---|---|---|---|
| curability $T_{90}$ seconds | 80 | 77 | 75 | 186 | 98 |
| durometer | 51 | 51 | 51 | 52 | 51 |
| tensile strength MPa | 7.9 | 8.0 | 8.2 | 8.5 | 8.0 |
| elongation % | 310 | 320 | 320 | 330 | 310 |
| color change | no | no | no | present | no |

We claim:

1. A heat-curable silicone rubber composition comprising (A) 100 weight parts organopolysiloxane with an average unit formula $R_xSiO_{(4-x)/2}$ containing at least 2 silicon-bonded alkenyl groups in each molecule, where each R is independently selected from the group consisting of hydroxyl and substituted and unsubstituted monovalent hydrocarbon groups and x has a value from 1.9 to 2.1, (B) 10 to 100 weight parts reinforcing filler, (C) 0.1 to weight parts carbosiloxane dendrimer that contains at least 3 silicon-bonded hydrogen atoms in each molecule, and (D) 0.1 to weight parts organoperoxide.

2. The heat-curable silicone rubber composition of claim 1, where the carbosiloxane dendrimer contains at least one siloxane unit with the general formula

where $R^1$ is a $C_1$ to $C_{10}$ alkyl or an aryl, a is an integer from 0 to 2, and $X^1$ is a silylalkyl group with the following formula at i=1

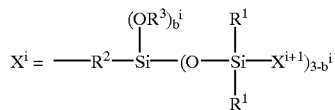

$R^1$ is a $C_1$ to $C_{10}$ alkyl or an aryl, $R^2$ is a $C_2$ to $C_{10}$ alkylene, $R^3$ is a $C_1$ to $C_{10}$ alkyl, $X^{i+1}$ is the above-defined silylalkyl group at i=i+1 or the hydrogen atom, i is an integer with a value from 1 to 10 that specifies the generation of the silylalkyl group, and $b^i$ is an integer from 0 to 3 with the proviso that $b^1$ in at least one $X^1$ in each molecule is an integer from 0 to 2; wherein when more than 1 of the siloxane units is present they may be the same or different, and the dendrimer has for its core a polysiloxane structure of at least 2 silicon atoms that contains the aforesaid siloxane unit(s) and contains at least 3 silicon-bonded hydrogen atoms in each molecule.

3. The heat-curable silicone rubber composition of claim 1 where the carbosiloxane dendrimer is described by average formula

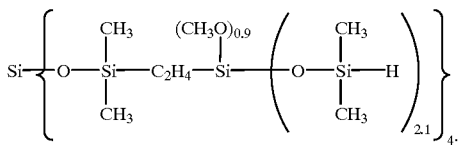

4. The heat-curable silicone rubber composition of claim 1 where the carbosiloxane dendrimer is described by average formula

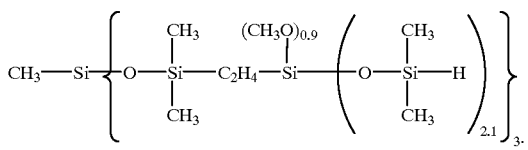

5. The heat-curable silicone rubber composition of claim 1 where the carbosiloxane dendrimer is described by average formula

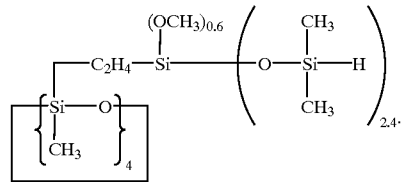

6. The heat-curable silicone rubber composition of claim 1 where the carbosiloxane dendrimer is selected from the group consisting essentially of carbosiloxane dendrimers having the following general formulas

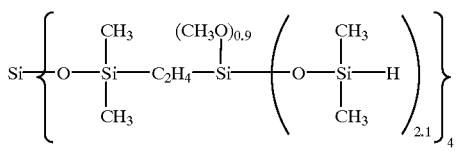

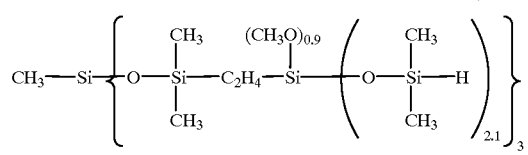

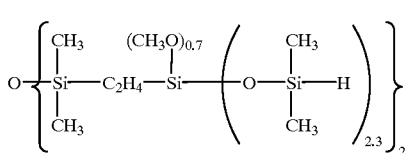

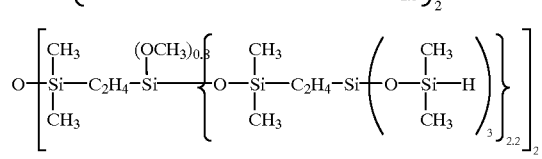

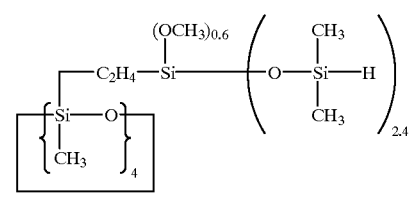
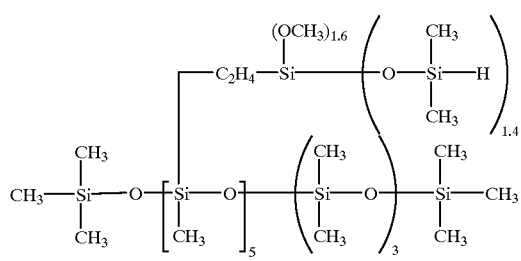
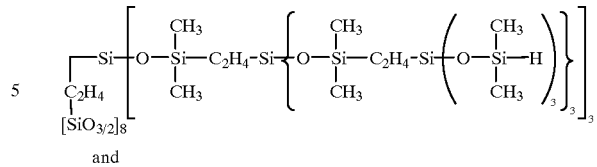
and
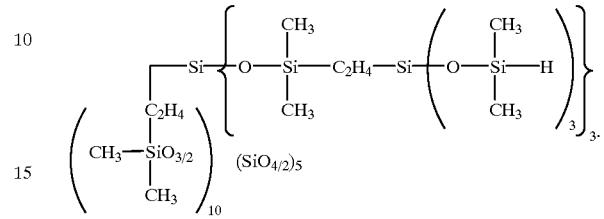
* * * * *